US009065879B2

(12) United States Patent
Armstrong et al.

(10) Patent No.: US 9,065,879 B2
(45) Date of Patent: *Jun. 23, 2015

(54) METHODS AND SYSTEMS FOR SELECTING MEDIA CONTENT BASED ON TECHNICAL ENVIRONMENT INFORMATION

(71) Applicant: eBay Inc., San Jose, CA (US)

(72) Inventors: Brooke Allysoun Armstrong, Berkeley, CA (US); John Robert Behrens, Emeryville, CA (US); Abie Hadjitarkhani, San Fransisco, CA (US); Alexander Blair Ireland, East Norriton, PA (US); Stephen John Muller, San Fransisco, CA (US); Nancy Kiyoko Narimatsu, Brisbane, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,777

(22) Filed: Apr. 1, 2013

(65) Prior Publication Data

US 2013/0227003 A1     Aug. 29, 2013

Related U.S. Application Data

(63) Continuation of application No. 12/057,704, filed on Mar. 28, 2008, now Pat. No. 8,417,820, which is a continuation of application No. 11/184,774, filed on Jul. 20, 2005, now Pat. No. 7,421,482, which is a continuation of application No. 09/693,867, filed on Oct. 23, 2000, now Pat. No. 6,985,934.

(51) Int. Cl.
*G06F 15/173* (2006.01)
*H04L 29/06* (2006.01)
*G06Q 30/02* (2012.01)

(52) U.S. Cl.
CPC .............. *H04L 67/42* (2013.01); *G06Q 30/02* (2013.01); *G06Q 30/0256* (2013.01); *G06Q 30/0277* (2013.01)

(58) Field of Classification Search
CPC ........................................................ H04L 67/42
USPC ......................................... 709/203, 227, 228
See application file for complete search history.

(56) References Cited

U.S. PATENT DOCUMENTS 5,187,787 A   2/1993   Skeen et al.
5,305,195 A   4/1994   Murphy
(Continued)

FOREIGN PATENT DOCUMENTS

EP    0996253 A2    4/2000
WO    WO-9707656   3/1997
(Continued)

OTHER PUBLICATIONS

"U.S. Appl. No. 09/693,867, Examiner Interview Summary mailed Feb. 15, 2005", 1 pg.
(Continued)

*Primary Examiner* — Adnan Mirza
(74) *Attorney, Agent, or Firm* — Schwegman Lundberg & Woessner, P.A.

(57) ABSTRACT

The present disclosure includes methods and systems for selecting media content based on technical environment information. A connection over a network between a server and a client is established. The e connection is associated with the technical environment information and the technical environment information is associated with an the ability of the client to playback media content locally. The method includes selecting, at the server, a version of media content appropriate for playback at the client locally based on the ability of the client.

19 Claims, 8 Drawing Sheets

(56) References Cited

U.S. PATENT DOCUMENTS

| | | |
|---|---|---|
| 5,347,632 A | 9/1994 | Filepp et al. |
| 5,390,256 A | 2/1995 | Mandell et al. |
| 5,515,490 A | 5/1996 | Buchanan et al. |
| 5,572,643 A | 11/1996 | Judson |
| 5,604,542 A | 2/1997 | Dedrick |
| 5,666,359 A | 9/1997 | Bennett et al. |
| 5,706,434 A | 1/1998 | Kremen et al. |
| 5,727,184 A | 3/1998 | Richter et al. |
| 5,737,619 A | 4/1998 | Judson |
| 5,740,549 A | 4/1998 | Reilly et al. |
| 5,742,602 A | 4/1998 | Bennett |
| 5,848,415 A | 12/1998 | Guck |
| 5,872,781 A | 2/1999 | Bennett et al. |
| 5,898,833 A | 4/1999 | Kidder |
| 5,903,673 A | 5/1999 | Wang et al. |
| 5,905,885 A | 5/1999 | Richter et al. |
| 5,913,040 A | 6/1999 | Rakavy et al. |
| 5,914,712 A | 6/1999 | Sartain et al. |
| 5,917,816 A | 6/1999 | Jacobsohn |
| 5,933,811 A | 8/1999 | Angles et al. |
| 5,936,960 A | 8/1999 | Stewart |
| 5,937,392 A | 8/1999 | Alberts |
| 5,951,639 A | 9/1999 | MacInnis |
| 5,953,506 A | 9/1999 | Kalra et al. |
| 5,956,716 A | 9/1999 | Kenner et al. |
| 5,956,729 A | 9/1999 | Goetz et al. |
| 5,987,510 A | 11/1999 | Imai et al. |
| 5,999,912 A | 12/1999 | Wodarz et al. |
| 6,006,197 A | 12/1999 | D'Eon et al. |
| 6,006,241 A | 12/1999 | Purnaveja et al. |
| 6,006,265 A | 12/1999 | Rangan et al. |
| 6,009,410 A | 12/1999 | LeMole et al. |
| 6,014,694 A | 1/2000 | Aharoni et al. |
| 6,018,765 A | 1/2000 | Durana et al. |
| 6,023,714 A | 2/2000 | Hill et al. |
| 6,029,200 A | 2/2000 | Beckerman et al. |
| 6,035,339 A | 3/2000 | Agraharam et al. |
| 6,044,408 A | 3/2000 | Engstrom et al. |
| 6,088,732 A | 7/2000 | Smith et al. |
| 6,092,114 A | 7/2000 | Shaffer et al. |
| 6,248,946 B1 | 6/2001 | Dwek |
| 6,288,716 B1 | 9/2001 | Humpleman et al. |
| 6,314,451 B1 | 11/2001 | Landsman et al. |
| 6,314,565 B1 | 11/2001 | Kenner et al. |
| 6,317,761 B1 | 11/2001 | Landsman et al. |
| 6,317,789 B1 | 11/2001 | Rakavy et al. |
| 6,345,279 B1 | 2/2002 | Li et al. |
| 6,415,327 B1 | 7/2002 | Beckerman et al. |
| 6,430,624 B1 | 8/2002 | Jamtgaard et al. |
| 6,442,529 B1 | 8/2002 | Krishan et al. |
| 6,442,758 B1 | 8/2002 | Jang et al. |
| 6,470,378 B1 | 10/2002 | Tracton et al. |
| 6,496,857 B1 | 12/2002 | Dustin et al. |
| 6,505,160 B1 | 1/2003 | Levy et al. |
| 6,516,338 B1 | 2/2003 | Landsman et al. |
| 6,564,380 B1 | 5/2003 | Murphy |
| 6,594,699 B1 | 7/2003 | Sahai et al. |
| 6,631,498 B1 | 10/2003 | McCauley et al. |
| 6,658,659 B2 | 12/2003 | Hiller et al. |
| 6,738,803 B1 | 5/2004 | Dodrill et al. |
| 6,823,225 B1 | 11/2004 | Sass |
| 6,917,965 B2 | 7/2005 | Gupta et al. |
| 6,976,059 B1 | 12/2005 | Rogalski et al. |
| 6,983,331 B1 | 1/2006 | Mitchell et al. |
| 6,985,932 B1 | 1/2006 | Glaser et al. |
| 6,985,934 B1 | 1/2006 | Armstrong |
| 6,990,514 B1 | 1/2006 | Dodrill et al. |
| 7,188,186 B1 | 3/2007 | Meyer et al. |
| 8,060,625 B2 | 11/2011 | Armstrong et al. |
| 8,417,820 B2 | 4/2013 | Armstrong et al. |
| 2002/0191116 A1 | 12/2002 | Kessler et al. |
| 2003/0177269 A1 | 9/2003 | Robinson et al. |
| 2007/0027983 A1 | 2/2007 | Bowra et al. |
| 2008/0098452 A1 | 4/2008 | Hardacker et al. |
| 2008/0120683 A1 | 5/2008 | Frazier et al. |
| 2008/0216122 A1 | 9/2008 | Pong et al. |
| 2014/0223503 A1 | 8/2014 | Govande et al. |

FOREIGN PATENT DOCUMENTS

| | | |
|---|---|---|
| WO | WO-9707656 A3 | 3/1997 |
| WO | WO-9815091 A1 | 4/1998 |
| WO | WO-9957657 A1 | 11/1999 |
| WO | WO-9960504 A1 | 11/1999 |

OTHER PUBLICATIONS

"U.S. Appl. No. 09/693,867, Final Office Action mailed Feb. 17, 2004", 7 pgs.

"U.S. Appl. No. 09/693,867, Non Final Office Action mailed Sep. 9, 2003", 5 pgs.

"U.S. Appl. No. 09/693,867, Non Final Office Action mailed Sep. 23, 2004", 7 pgs.

"U.S. Appl. No. 09/693,867, Notice of Allowance mailed Apr. 22, 2005", 4 pgs.

"U.S. Appl. No. 09/693,867, Response filed Jan. 9, 2004 to Non Final Office Action mailed Sep. 9, 2003", 16 pgs.

"U.S. Appl. No. 09/693,867, Response filed Feb. 23, 2005 to Non Final Office Action mailed Sep. 23, 2004", 17 pgs.

"U.S. Appl. No. 09/693,867, Response filed Jul. 19, 2004 to Final Office Action mailed Jan. 9, 2004", 18 pgs.

"U.S. Appl. No. 11/184,774, Final Office Action mailed Aug. 30, 2007", 6 pgs.

"U.S. Appl. No. 11/184,774, Final Office Action mailed Oct. 6, 2006", 7 pgs.

"U.S. Appl. No. 11/184,774, Non Final Office Action mailed Mar. 17, 2006", 6 pgs.

"U.S. Appl. No. 11/184,774, Non Final Office Action mailed Apr. 18, 2007", 5 pgs.

"U.S. Appl. No. 11/184,774, Non-Final Office Action mailed Jan. 23, 2008", 8 pgs.

"U.S. Appl. No. 11/184,774, Notice of Allowance mailed Jun. 6, 2008", 6 pgs.

"U.S. Appl. No. 11/184,774, Response filed Apr. 5, 2007 to Final Office Action mailed Oct. 6, 2006", 11 pgs.

"U.S. Appl. No. 11/184,774, Response filed Apr. 23, 2008 to Non-Final Office Action mailed Jan. 23, 2008", 8 pgs.

"U.S. Appl. No. 11/184,774, Response filed Jul. 18, 2007 to Non Final Office Action mailed Apr. 18, 2007", 14 pgs.

"U.S. Appl. No. 11/184,774, Response filed Sep. 18, 2006 to Non Final Office Action mailed Mar. 17, 2006", 7 pgs.

"U.S. Appl. No. 11/184,774, Response filed Oct. 30, 2007 to Final Office Action mailed Aug. 30, 2007", 17 pgs.

"U.S. Appl. No. 11/966,547, Appeal Brief filed Apr. 5, 2012", 25 pgs.

"U.S. Appl. No. 11/966,547, Advisory Action mailed Jan. 26, 2012", 3 pgs.

"U.S. Appl. No. 11/966,547, Examiner's Answer to Appeal Brief mailed Aug. 6, 2012", 5 pgs.

"U.S. Appl. No. 11/966,547, Final Office Action mailed Sep. 21, 2010", 10 pgs.

"U.S. Appl. No. 11/966,547, Final Office Action mailed Nov. 4, 2011", 22 pgs.

"U.S. Appl. No. 11/966,547, Non Final Office Action mailed May 5, 2011", 22 pgs.

"U.S. Appl. No. 11/966,547, Non Final Office Action mailed Dec. 2, 2010", 20 pgs.

"U.S. Appl. No. 11/966,547, Non-Final Office Action mailed Apr. 6, 2010", 11 pgs.

"U.S. Appl. No. 11/966,547, Pre-Appeal Brief Request filed Feb. 6, 2012", 5 pgs.

"U.S. Appl. No. 11/966,547, Preliminary Amendment filed Dec. 28, 2007", 4 pgs.

"U.S. Appl. No. 11/966,547, Reply Brief filed Oct. 8, 2012", 11 pgs.

"U.S. Appl. No. 11/966,547, Response filed Jan. 4, 2012 to Final Office Action mailed Nov. 4, 2011", 17 pgs.

"U.S. Appl. No. 11/966,547, Response filed Mar. 1, 2011 to Non Final Office Action mailed Dec. 2, 2010", 14 pgs.

(56) References Cited

OTHER PUBLICATIONS

"U.S. Appl. No. 11/966,547, Response filed Jul. 6, 2010 to Non Final Office Action mailed Apr. 6, 2010", 13 pgs.
"U.S. Appl. No. 11/966,547, Response filed Aug. 5, 2011 to Non Final Office Action mailed May 5, 2011", 18 pgs.
"U.S. Appl. No. 11/966,547, Response filed Nov. 18, 2010 to Final Office Action mailed Sep. 21, 2010", 14 pgs.
"U.S. Appl. No. 11/966,774, Final Office Action mailed Nov. 3, 2009", 10 pgs.
"U.S. Appl. No. 11/966,774, Non-Final Office Action mailed Mar. 13, 2009", 9 pgs.
"U.S. Appl. No. 11/966,774, Notice of Allowance mailed Feb. 19, 2010", 7 pgs.
"U.S. Appl. No. 11/966,774, Notice of Allowance mailed May 7, 2010", 4 pgs.
"U.S. Appl. No. 11/966,774, Preliminary Amendment filed Dec. 18, 2007", 4 pgs.
"U.S. Appl. No. 11/966,774, Response filed Feb. 2, 2010 to Final Office Action mailed Nov. 3, 2009", 10 pgs.
"U.S. Appl. No. 11/966,774, Response filed Aug. 13, 2009 to Non Final Office Action mailed Mar. 13, 2009", 9 pgs.
"U.S. Appl. No. 12/057,663, Advisory Action mailed Feb. 8, 2005", Advisory Action, 3 pgs.
"U.S. Appl. No. 12/057,663, Final Office Action mailed Apr. 19, 2010", 6 pgs.
"U.S. Appl. No. 12/057,663, Final Office Action mailed Nov. 26, 2010", 5 pgs.
"U.S. Appl. No. 12/057,663, Non Final Office Action mailed Mar. 22, 2011", 6 pgs.
"U.S. Appl. No. 12/057,663, Non Final Office Action mailed Nov. 3, 2009", 9 pgs.
"U.S. Appl. No. 12/057,663, Non-Final Office Action mailed Jul. 26, 2010", 6 pgs.
"U.S. Appl. No. 12/057,663, Notice of Allowance mailed Jun. 27, 2011", 5 pgs.
"U.S. Appl. No. 12/057,663, Response filed Jan. 25, 2011 to Final Office Action mailed Nov. 26, 2010", 15 pgs.
"U.S. Appl. No. 12/057,663, Response filed Feb. 3, 2010 to Non Final Office Action mailed Nov. 3, 2009", 12 pgs.
"U.S. Appl. No. 12/057,663, Response filed Jun. 15, 2011 to Non Final Office Action mailed Mar. 22, 2011", 7 pgs.
"U.S. Appl. No. 12/057,663, Response filed Jul. 19, 2010 to Final Office Action mailed Apr. 19, 2010", 13 pgs.
"U.S. Appl. No. 12/057,663, Response filed Oct. 25, 2010 to Non Final Office Action mailed Jul. 26, 2010", 11 pgs.
"U.S. Appl. No. 12/057,683, Advisory Action mailed Jun. 8, 2012", 3 pgs.
"U.S. Appl. No. 12/057,683, Advisory Action mailed Jul. 17, 2013", 3 pgs.
"U.S. Appl. No. 12/057,683, Decision on Pre-Appeal Brief mailed Aug. 27, 2012", 2 pgs.
"U.S. Appl. No. 12/057,683, Final Office Action mailed Mar. 26, 2012", 23 pgs.
"U.S. Appl. No. 12/057,683, Final Office Action mailed May 7, 2013", 17 pgs.
"U.S. Appl. No. 12/057,683, Final Office Action mailed Aug. 15, 2011", 19 pgs.
"U.S. Appl. No. 12/057,683, Final Office Action mailed Dec. 17, 2010", 14 pgs.
"U.S. Appl. No. 12/057,683, Non Final Office Action mailed Apr. 6, 2011", 18 pgs.
"U.S. Appl. No. 12/057,683, Non Final Office Action mailed Oct. 17, 2011", 22 pgs.
"U.S. Appl. No. 12/057,683, Non-Final Office Action mailed Jun. 21, 2010", 19 pgs.
"U.S. Appl. No. 12/057,683, Pre-Appeal Brief Request for Review filed Jun. 25, 2012", 5 pgs.
"U.S. Appl. No. 12/057,683, Response filed Jan. 17, 2012 to Non Final Office Action mailed Oct. 17, 2011", 18 pgs.
"U.S. Appl. No. 12/057,683, Response filed Feb. 14, 2013 to Non Final Office Action mailed Nov. 14, 2012", 21 pgs.
"U.S. Appl. No. 12/057,683, Response filed Feb. 25, 2011 to Final Office Action mailed Dec. 17, 2010", 12 pgs.
"U.S. Appl. No. 12/057,683, Response filed May 25, 2012 to Final Office Action mailed Mar. 26, 2012", 20 pgs.
"U.S. Appl. No. 12/057,683, Response filed Jul. 8, 2013 to Final Office Action mailed May 7, 2013", 15 pgs.
"U.S. Appl. No. 12/057,683, Response filed Aug. 31, 2011 to Final Office Action mailed Aug. 15, 2011", 17 pgs.
"U.S. Appl. No. 12/057,683, Response filed Sep. 21, 2010 to Non Final Office Action mailed Jun. 21, 2010", 11 pgs.
"U.S. Appl. No. 12/057,683, Response filed Jul. 6, 2011 to Non Final Office Action mailed Apr. 6, 2011", 14 pgs.
"U.S. Appl. No. 12/057,704, Response filed Oct. 3, 2011 to Final Office Action mailed Aug. 1, 2011", 15 pgs.
"U.S. Appl. No. 12/057,704, 312 Amendment mailed Feb. 11, 2013", 10 pgs.
"U.S. Appl. No. 12/057,704, Advisory Action mailed Dec. 13, 2010", 3 pgs.
"U.S. Appl. No. 12/057,704, Final Office Action mailed Aug. 1, 2011", 16 pgs.
"U.S. Appl. No. 12/057,704, Final Office Action mailed Oct. 1, 2010", 11 pgs.
"U.S. Appl. No. 12/057,704, Non Final Office Action mailed Feb. 4, 2011", 13 pgs.
"U.S. Appl. No. 12/057,704, Non Final Office Action mailed Apr. 29, 2011", 16 pgs.
"U.S. Appl. No. 12/057,704, Non-Final Office Action mailed Apr. 16, 2010", 13 pgs.
"U.S. Appl. No. 12/057,704, Notice of Allowance mailed Nov. 9, 2012", 14 pgs.
"U.S. Appl. No. 12/057,704, PTO Response to 312 Communication mailed Mar. 11, 2013", 2 pgs.
"U.S. Appl. No. 12/057,704, Response filed Jan. 3, 2011 to Advisory Action mailed Dec. 13, 2010", 13 pgs.
"U.S. Appl. No. 12/057,704, Response filed May 3, 2011 to Non Final Office Action mailed Feb. 4, 2011 and Apr. 29, 2011", 16 pgs.
"U.S. Appl. No. 12/057,704, Response filed Jul. 16, 2010 to Non Final Office Action mailed Apr. 16, 2010", 12 pgs.
"U.S. Appl. No. 12/057,704, Response filed Dec. 1, 2010 to Final Office Action mailed Oct. 1, 2010", 13 pgs.
"BrowserSpy", (Copyright: 1995-2000).
"Check Plugins", NPL1, (Copyright: 1999).
"Detecting the Presence/Version of QuickTime from Web Browsers on Windows", QuickTime 4.1./4.1.2, (Updated on May 1, 2000), 6 Pages.
"International Application Serial No. PCT/US2001/040525, International Search Report mailed Jun. 3, 2002", 3 pgs.
"International Application Serial No. PCT/US2001/040525, International Preliminary Examination Report mailed Sep. 30, 2003", 3 pgs.
"OPERAscript User and Development Manual", (Jul. 2000).
"Spyglass Prism", Spyglass Prism. Concepts and Applications, XP002907213, (Jan. 1, 1997), 8 pgs.
"Windows Media Player: Advanced Scripting for Cross-Browser Functionality", (Updated on Nov. 2000).
HKCL Project Group, "Hong Kong Cyber library", (Apr. 20, 2000).
Microsoft Corporation, "Adding Windows Media to Web Pages", (Dec. 2000).
Microsoft Corporation, "Detecting a Player on a Consumers Computer for Windows Media Rights Manager 1", (Updated on Jan. 10, 2000).
"U.S. Appl. No. 12/057,683, Decision on Pre-Appeal Brief Request mailed Sep. 23, 2013", 2 pgs.
"U.S. Appl. No. 12/057,683, Examiner's Answer mailed Feb. 25, 2014", 15 pgs.
"U.S. Appl. No. 12/057,683, Pre-Appeal Brief Request filed Aug. 7, 2013", 5 pgs.
"U.S. Appl. No. 13/756,847, Examiner Interview Summary mailed Feb. 21, 2014", 3 pgs.

(56) References Cited

OTHER PUBLICATIONS

"U.S. Appl. No. 13/756,847, Final Office Action mailed Mar. 13, 2014", 8 pgs

"U.S. Appl. No. 13/756,847, Non Final Office Action mailed Feb. 6, 2014", 8 pgs.

"U.S. Appl. No. 13/756,847, Non Final Office Action mailed May 15, 2014", 9 pgs.

"U.S. Appl. No. 13/756,847, Notice of Allowance mailed Sep. 9, 2014", 9 pgs

"U.S. Appl. No. 13/756,847, Response filed Feb. 27, 2014 to Non Final Office Action mailed Feb. 6, 2014", 8 pgs.

"U.S. Appl. No. 13/756,847, Response filed Apr. 30, 2014 to Final Office Action mailed Mar. 13, 2014", 9 pgs.

"U.S. Appl. No. 13/756,847, Response filed Jul. 10, 2014 to Non Final Office Action mailed May 15, 2014", 8 pgs.

"Spyglass Prism, Concepts and Applications", (1997), 1-7.

Figure 2
Figure 2A
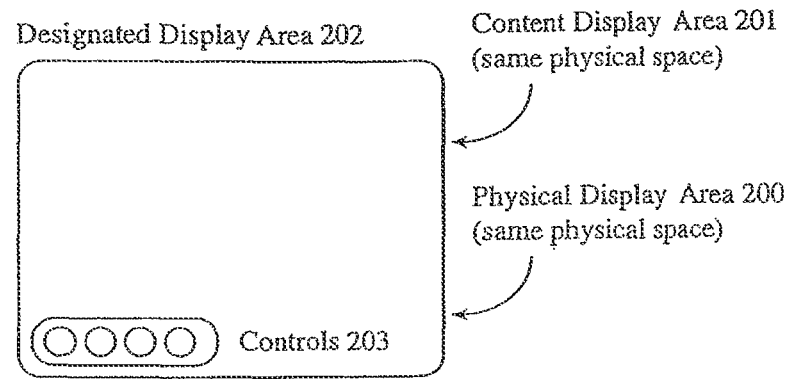
Figure 2B
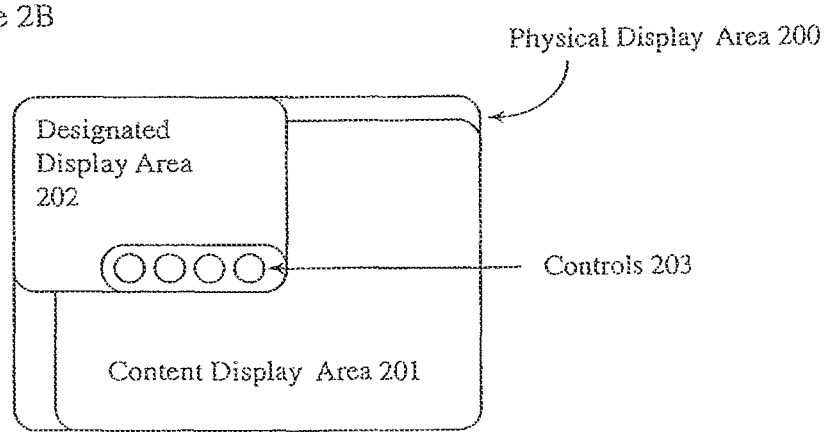
Figure 2C
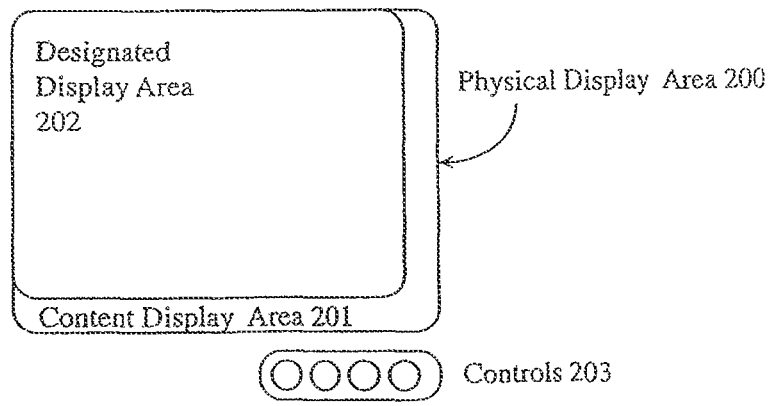

METHODS AND SYSTEMS FOR SELECTING MEDIA CONTENT BASED ON TECHNICAL ENVIRONMENT INFORMATION

RELATED APPLICATIONS

The present patent application is a continuation of U.S. patent application Ser. No. 12/057,704 filed Mar. 28, 2008 and entitled "METHOD AND SYSTEM FOR SELECTING MEDIA CONTENT BASED ON TECHNICAL ENVIRONMENT INFORMATION, which is a continuation of U.S. patent application Ser. No. 11/184,774 filed Jul. 20, 2005 and entitled "METHOD AND SYSTEM FOR PROVIDING RICH MEDIA CONTENT OVER A COMPUTER NETWORK, which is a continuation of U.S. patent application Ser. No. 09/693,867 filed Oct. 23, 2000 and entitled "METHOD AND SYSTEM FOR PROVIDING RICH MEDIA CONTENT OVER A COMPUTER NETWORK.," which issued as U.S. Pat. No. 6,985,934, and which applications are incorporated herein by reference in their entirety.

BACKGROUND OF THE INVENTION

1. Field of the Invention

The present invention is directed to a method and system tier providing rich media content over a computer network and more particularly to a highly reliable, transparent process for displaying high-quality online advertising imagery.

2. Related Art

Computer networks, including the Internet, are a new and rapidly growing means of communication. There are currently over 300 million network users worldwide, and that number is expected to double in less than five years according to the Computer Industry Almanac (www.c-i-a.com). Because of their numbers, and because they are believed to be high-end consumers, users of the Internet and other computer networks are an attractive audience for advertising messages. According to figures from the Internet Advertising Bureau ("IAB"; www.iab.net), expenditures for Internet advertising are growing even faster than the number of network users—at almost 25 percent per quarter—and currently total over $7 billion per year.

The current standard for Internet advertising is the banner ad, a cartoon-like color image that occupies a fixed part of a web page. Banner ads usually come in one of a small number of standard sizes, and they sometimes include crude animation created by rapidly and repeatedly superposing a small number of images in the same space. Banner ads comprise the majority of Internet advertising—historically over half of total expenditures and around three-quarters of that on discrete ads (as opposed to sponsorships) according to the IAB.

The content of a banner ad image is contained in a computer file that is interpreted and displayed by a network user's web-browser program (e.g., Netscape Navigator, Microsoft Internet Explorer). Almost all banner ad files use the GIF89a format, which can be interpreted and displayed by all major web-browser programs currently on the market.

Each banner ad's file, plus the file containing the content of the host web page itself, must be transmitted to, and stored on, a network user's computer before the complete web page (ads and content) can be displayed. There may be many—sometimes dozens—of banner ads on a page, and advertisers often demand that the page be configured to display the ads first. To keep network users from waiting too long to see the content of their pages, web page owners frequently impose limits on the size of the banner ad files they will accept. These limits, in turn, sharply constrain the appearance of banner ads, e.g., by reducing the number of images per ad or the number of items per image, or by restricting the variety of colors or level of detail in an item or image.

Such limitations have combined to reduce the effectiveness of banner ads in two ways. First, they are—and because of file size limitations must remain—crude. Because banner ads are typically simple cartoons in an environment of increasingly rich and complex media, the viewing audience is becoming less responsive to the ads. The average "click-through" rate, the rate at which viewers respond to a banner ad by "clicking" on it and being transferred to the web site advertised by the banner, is falling rapidly—by almost an order of magnitude during the past five years, according to contemporary estimates in Advertising Age magazine. Secondly, despite limitations on their file sizes, banner ads often delay viewing of web page content to the point that users routinely redirect their browsers away in frustration; the very presence of the ads lowers their own viewership. Dwell-time, a measure of the time an average network user spends looking at a single page, is also declining.

In brief, banner ads, though they dominate advertising on the Internet and are so much the standard that they are directly interpretable by every major web-browser program, are an obsolete and increasingly self-defeating technology.

Advertisers, aware of the limitations of banner ads, have tried two approaches to improve upon them. The first approach is to replace the cartoon-like banner ad images with video ads, i.e., online ads that use moving, photographic-quality images rather than simple single images or series of a few simple single images. The second approach, referred to generally as interstitial ads, sometimes called pop-up ads, avoids some of the technical problems of banner ads and video ads by effectively separating the interstitial ads from their host web pages. Both approaches, though, like the banner ad approach, have run into technical and consumer-response barriers.

Video ads, unlike GIF89a-format images, cannot be displayed directly by web-browser programs. Instead, they are encoded in one of several specialized formats (e.g., MPEG, QTF, AVI) and are displayed by separate—and similarly specialized—video replay programs. Such video replay programs are separate from the web-browser programs, but they are compatible with the browsers and sometimes are referred to as plug-ins to the browsers. Some replay programs are distributed with computer operating systems, while others are available separately, either for free or at a cost. Some replay programs can interpret more than one format, although none can interpret even a large minority of the existing variety of formats, and file formats are different enough that any multi-format program is essentially a package of single-format programs. Because of the multiplicity of formats and distribution methods, and because many formats are in fairly wide use, it is unlikely that any single standard will emerge in the near future. In other words, unlike GIF image technology, the technology of computer video replay is non-standardized and is functionally complicated, and it is likely to remain so.

To view a video, a user's computer must receive at least part of the file and then activate and run a compatible replay program. This process frequently includes one or more "dialogues" between the computer and the user. For example, if the file is to be stored and then replayed, the user must specify a storage name (or approve the computer's choice) and then activate the replay. If the computer cannot determine which replay program to use, the user must specify it. And if there is no compatible replay program on the computer, the user must either cancel the replay or spend time (and possibly money) identifying, locating, and obtaining one. The complexity and time requirements of this process can be daunting even if the user actively seeks to view the video; for advertising, which needs to be entirely passive and nearly instantaneous, these are major barriers.

Another barrier to the use of video ads is imposed by the sheer size of most video files. Video images, like any other computer data, are stored and transmitted as computer files. Because of the complexity of the images (color, resolution, etc.) and the number of images in a file (usually thousands), video files typically are very large. For example, a word-processing document file may be on the order of a few dozen kilobytes (KB), and a typical web page file may be around a hundred KB, but even a thirty-second video will require a file size of thousands of KB (i.e., several megabytes, or MB). Using a standard telephone modem connection, whose transmission rate is limited by telephone technology and federal regulation, not by computer modem technology, a file of even a few megabytes can require many minutes to receive and store. For example, with a 56 K modem and an effective transmission rate of over 50 K, transmission requires at least three minutes per megabyte. Faster connections (e.g., via DSL or institutional intra-net) reduce this time substantially, but not so much that the file transmission does not cause a noticeable interruption. Further, those types of connections are available to only a portion of the user population. As noted above, computer users are becoming increasingly impatient with any delay, especially for the sake of advertising, and in any case most advertisers are unwilling to limit their messages to only a portion of the population.

To address the problem of file size, specialized protocols were developed that allow near-real-time playback. Sometimes called streaming, these protocols begin playback when only a portion of the file has been transmitted and stored on the user's computer (i.e., buffered). Later portions of the file are transmitted as earlier ones play back, and the parameters of the process are calibrated so that, if transmission is not interrupted, playback is continuous. The practical flaw in this approach is that transmission, particularly of large files, frequently is interrupted. Net congestion, transmission errors requiring retransmission, competing demands on the transmitting computer, and other causes, can interrupt the transmission flow long enough that the buffer is completely played out, and then playback stops until enough new data have been received. The effect on the user is that streaming video (or audio) either is occasionally interrupted by long pauses or has a jerky quality caused by frequent micro-pauses (the former with a large buffer size and the latter with a small one). These types of interruptions are unacceptable to advertisers, whose imagery requires seamless replay. Further, streaming video is subject to the same requirements as non-streaming video for identifying, obtaining, and/or activating a compatible replay program.

U.S. Pat. No. 6,029,200 to Beckerman et al. discloses a process that uses streaming video and provides a more automated approach to selecting a replay program. The "client" computer (e.g., the network user's computer) is offered a list of multiple versions of a video file, each in a different format, in a predetermined order, until a compatible format—if any—is found. This makes it more likely that the video eventually can be viewed by the user, but it requires the user's computer to know how to interpret and choose among the list of "offers," which presumably requires specialized software. It is not clear how noticeable the process would be to the user (e.g., delay, "dialogues"), and because it applies only to streaming video, the process does not address the problem of interruptions in playback. It thus can be considered another format, albeit a somewhat generalized one, but with questionable application to advertising.

Processes developed more recently bluestreak.com, Inc. (www.bluestreak.com) and AudioBase, Inc. (www.audiobase.com) also use streaming, and they circumvent the replay compatibility issue by transmitting their own replay programs along with the data files. These are examples of the usage of "push" technology, as used, e.g., in U.S. Pat. No. 5,740,549, issued Apr. 14, 1998 to Reilly et al. These processes are reasonably rapid—although still noticeable to the user-because neither handles full video; bluestreak offers audio, GIF-like animation, and other cartoon-like special effects, and AudioBase handles strictly audio. Both also are subject to the problems of streaming, such as "stuttering" and interruptions in playback. They thus are suitable for certain narrow, specialized forms of advertising, but their transmission delays are still non-negligible, and like other uses of streaming, their unreliable replay renders them problematic for advertising.

In summary, attempts to date to put video advertising onto Internet web pages have largely failed because of two fundamental technical characteristics of computer video—lack of standardization and very large file size—and their implications. Computer users are generally unwilling either to wait for large files to be transmitted or to take active steps to ensure a smooth replay, especially for the sake of viewing an advertisement. Advertisers are unwilling to spend money and effort on technologies that cannot reliably deliver uninterrupted imagery to a wide audience. What would satisfy both users and advertisers, but is lacking in the prior art, is a means for reliably delivering video ads without any interruption of the user's viewing experience. As a consequence, video advertising has been and remains a small and static fraction of all Internet advertising; expenditures on video have consistently been just a few percent of the total.

Interstitial advertisements—sometimes called pop-up ads—bypass some of the technical problems of on-page banner ads and video ads by effectively separating the online ads from their host web pages. The content of an interstitial ad is transmitted separately from those of its host web page. Transmission begins immediately after the host web page has been fully transmitted and while it is being displayed (i.e., during the "interstices" between other web page transmissions), and it may continue once the ad itself has begun displaying. The ad is displayed in a new "window" or other dedicated display area, either immediately after the host page is fully displayed (thus "popping up" in front of the host page) or when the user signals that he/she has finished reading the host page by closing it or activating a link to a new page. Interstitial ads can include GIF images, video, audio, or any other web page elements; they are essentially specialized web pages comprised entirely of advertising. Because they are transmitted separately, they do not delay the display of the host web page, and because the user presumably is occupied for some time reading the host web page, the ads can take much longer to transmit than on-page ads without seriously annoying the user.

Interstitial transmission of advertising is taught in U.S. Pat. No. 5,305,195, issued Apr. 19, 1994 to Murphy, for use on specialized computer terminals such as bank ATMs and school registration stations. More recent applications include U.S. Pat. No. 5,913,040, issued Jun. 15, 1999 to Rakavy et al.; U.S. Pat. No. 5,737,619, issued Apr. 7, 1998 and U.S. Pat. No. 5,572,643, issued Nov. 5, 1996, to Judson; and U.S. Pat. No. 5,604542, issued Feb. 18, 1997 to Dedrick.

The principal problem with interstitial ads is that, as dwell time statistics show, users' patience still limits the time available for transmission. While a user is reading the host page, there typically is sufficient download time for banner ads, other GIF images, other static images, simple animations, a streaming video buffer, and usually audio and other animated elements and associated programs such as those produced by the bluestreak and AudioBase processes. However, there is not sufficient time to transmit more than one buffer worth of a video file, and there is no opportunity to create a "dialogue" with the user until the interstitial ad is displayed. Consequently, both the number and the type of elements in an interstitial ad are constrained. Additionally, interstitial video ads are also subject to the same problems of non-standardization and display reliability as with on-page video ads.

A process developed by Unicast Communications Corp., disclosed in International Publication No. WO 99/60504, published Nov. 25, 1999, partially addresses these problems by installing a program on the user's computer that ensures that transmission of ads (and accompanying playback programs if any) as "polite" as possible. The concept of "polite" transmission—i.e., file transmission minimally noticeable to the user—avoids some of the problems associated with streaming by fully storing (or caching) ads on the users computer before displaying them. The Unicast program also checks that any necessary playback programs are available on the users computer before the ad is displayed. However, such a process is not practically applicable to video ads, because large files take a long time to transmit no matter how politely, and video replay programs are even larger than video ads and are seldom available for transmission along with them. It is also as yet unclear whether such a powerful program will be fully compatible with most network users' operating systems and browser programs, or whether privacy concerns will limit its functionality or popularity.

Overall, while interstitial ads solve some of the problems of computer network advertising, they as yet have shown only partial success at dealing with the non-standardization and file size issues associated with video ads, or with file sizes in general. Attempts to create a "smart" solution have only added new problems. At least partially as a result, interstitials historically have accounted for less than a tenth of Internet advertising expenditures, and that share has shrunk by almost half in the last year according to the IAB.

In summary, what is needed hut is missing in the prior art, is a highly reliable, entirely transparent process for displaying high-quality rich media content over a computer network.

The client may be any of a number of known electronic devices connected either physically or wirelessly to a server on the computer network. Such devices may include, but are not limited to, a desktop computer, a laptop computer, a handheld device, a telephone, a set top box, or an Internet appliance. In the preferred embodiment, the rich media comprises a short, highly compressed digital video file. For example, such rich media may be a 5-15 second long video advertisement.

BRIEF DESCRIPTION OF THE FIGURES

FIGS, 1A-1E show a computer network according to the present invention at various steps during a method for providing rich media content across a computer network according to the present invention.

FIGS. 2A-2C are various embodiments of a client display area according to the present invention.

DETAILED DESCRIPTION OF THE PREFERRED EMBODIMENTS

A preferred embodiment of the present invention is now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1A:
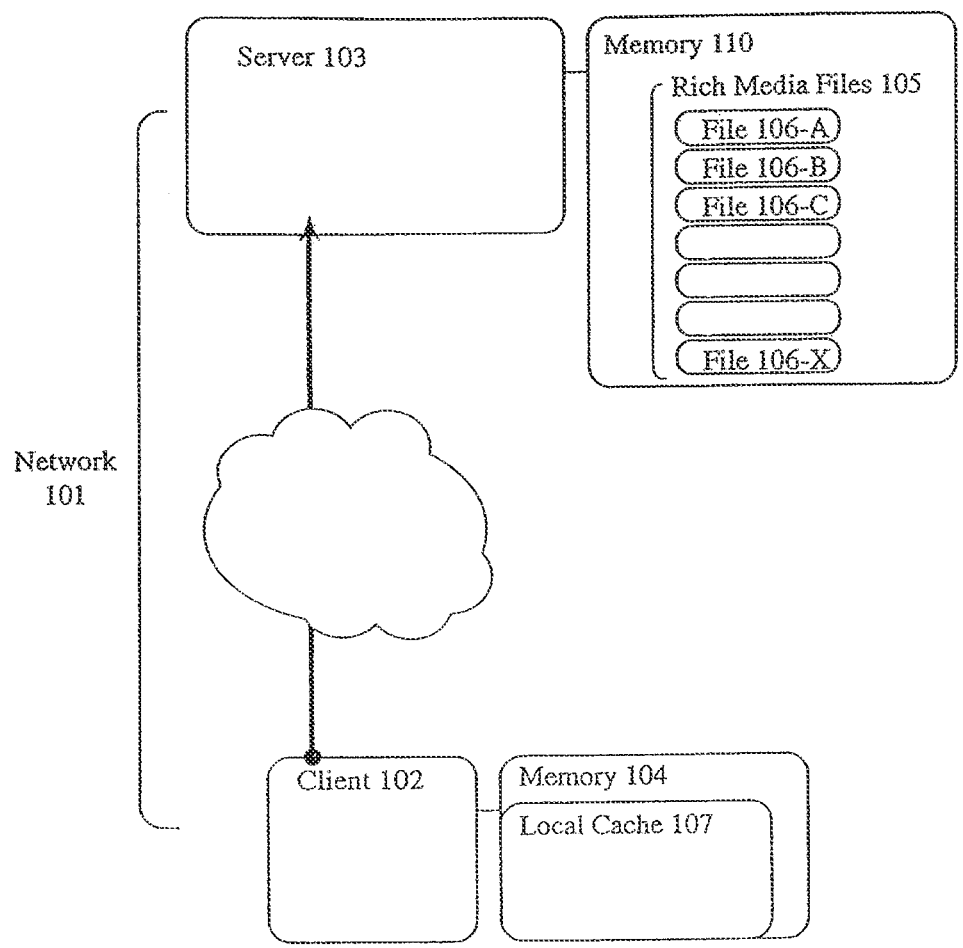

FIG. 1A shows a computer network 101 according to the present invention, consisting of a system of electronic devices connected either physically or wirelessly, wherein digital information is transmitted from one device to another. Such devices may include, but are not limited to, a desktop computer, a laptop computer, a handheld device, a telephone, a set top box, or an Internet appliance. FIG. 1A shows a client 102, defined as a computer program resident on a computer system, an item of hardware, or an electronic appliance that sends and receives digital information via computer network 101. Also shown is a server 103, defined as a computer program resident on a computer system, an item of hardware, or an electronic appliance that sends and receives digital information via computer network 101. The role of server 103 shown in FIG. 1A may in some cases be played by more than one actual server, as would be apparent to those skilled in the relevant art.

Server 103 also includes a memory 110 which stores digital files, including but not limited to software and data files. Specifically, memory 110 may contain one or more rich media files 105, defined as any electronic media content that includes moving images, video with or without audio, a sequence of images captured from frames of film, frames of video, or animated shapes. "Rich", in general, denotes electronic media information that includes more than only text or audio. Rich media files 105 are stored in the for of digital computer files. In the preferred embodiment, rich media file 105 is a 5-10 second video advertisement in the form of a highly compressed electronic file. Rich media files 105 can be stored, transmitted or displayed using a variety of proprietary and nonproprietary electronic file formats, such as Quick-Time, Windows Media Player, GIF89a, Flash, AIFF, WAV, RealAudio, RealVideo, or any of a number of file formats now emerging for wireless devices, such as HDML, WML, BMP, or formats associated with WCA, and other formats known to those skilled in the relevant art appropriate to various software, hardware, and electronic appliance display systems. The particular file format does not substantially affect the content of rich media file 105. Rich media files 105 may be previously created and stored in memory 110, or may be created "con-the-fly" in response to the requirements of client 102. As discussed below, the same rich media file 105 is stored in a number of different file formats (106-A, 106-B . . . 106-X) in memory 110 to facilitate the transfer and display of rich media file 105 across computer network 101 according to the present invention.

Client 102 also includes a memory 104, that is entirely contained within, or is entirely a part of client 102, which stores digital files, including, but not limited to, software and data files. A subset of client memory 104, local cache 107, is defined as that portion of client memory 104 that is used for temporary storage of data files received over computer network 101.

Figure 3:
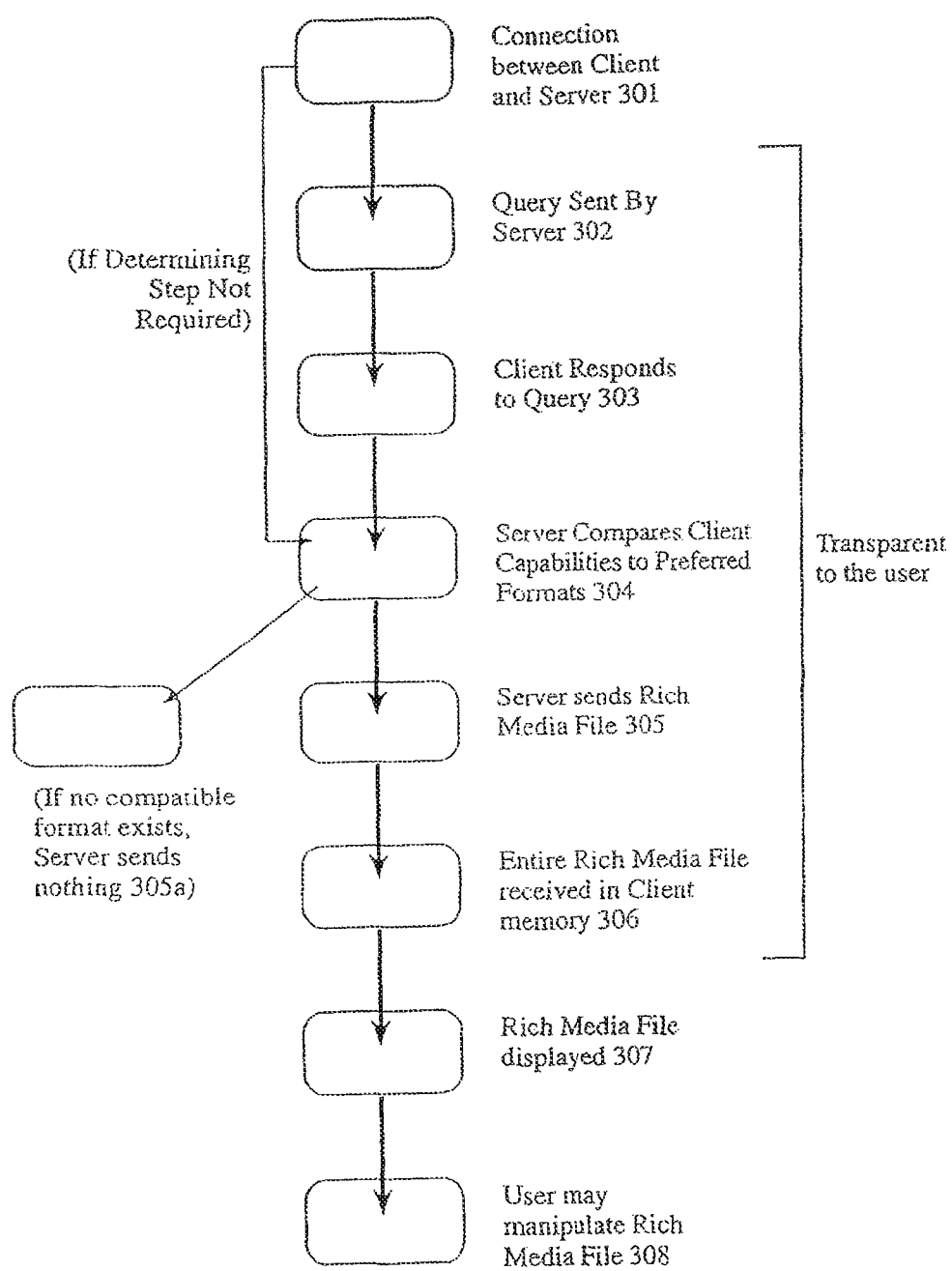
FIG. 3 is a process diagram of the method for providing rich media content across a computer network according to the present invention.

The process according to the present invention is initiated at a step 301, as shown in FIGS. 1A and 3, by client 102 becoming connected to server 103, for example a desktop computer user being connected to a web site using a web browser.

Figure 1B:
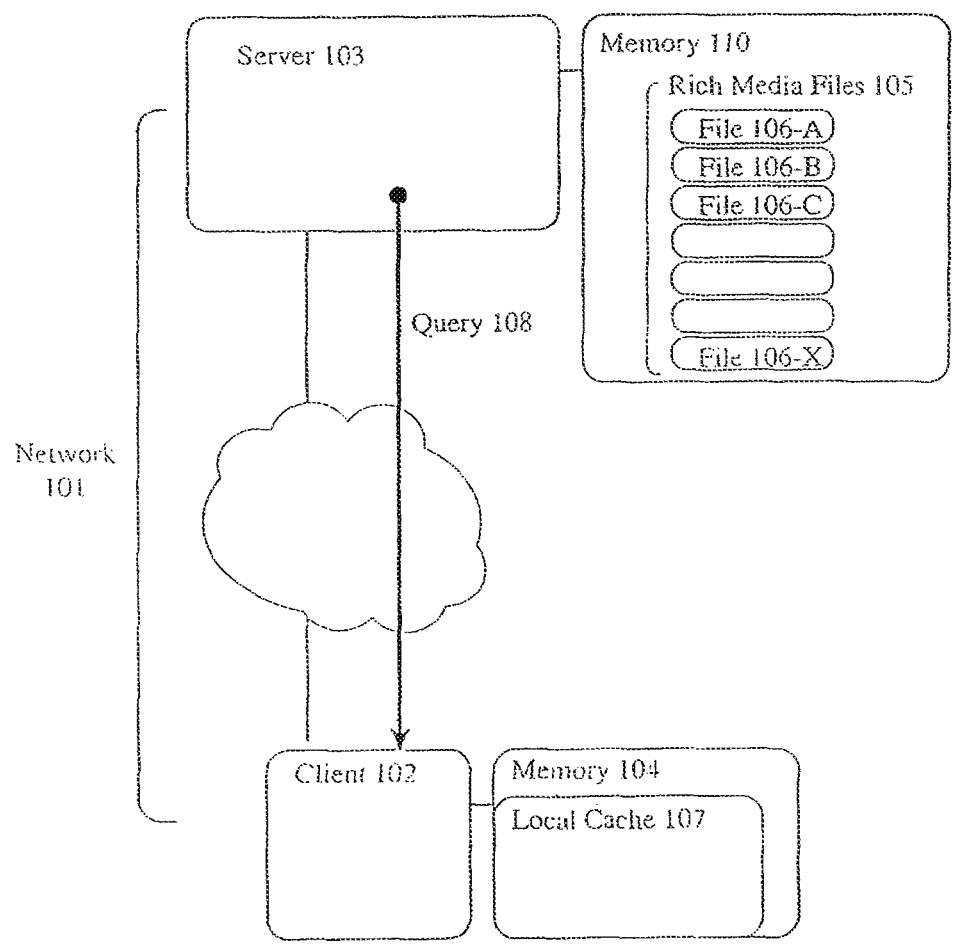

Next, at a step 302, as shown in FIGS. 1B and 3, server 103 sends a query 108 to client 102. Query 108 is a communication wherein server 103 requests data from client 102 regarding the presence or absence of specific software and/or hardware that are required to display rich media file 105, that has been prepared in specific file formats 106-A, 106-B . . . 106-X. In one embodiment, query 108 is performed by progressing, via one or more connections with client 102, through a set of preferred rich media content playback applications to assess the local playback capabilities of client 102. In the preferred embodiment, this procedure is transparent to the user, meaning that the user is not required to take action to initiate this step, and the process is not noticeable to the user.

Figure 1C:
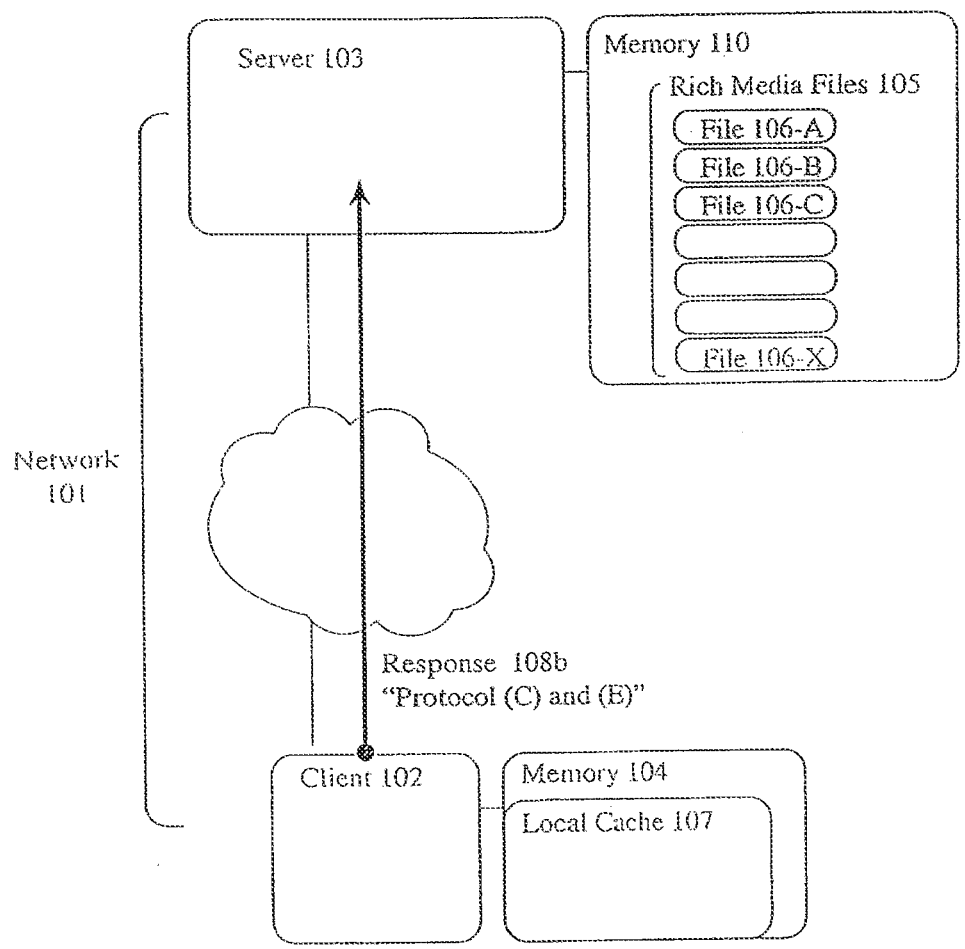

At a step 303, as shown in FIGS. 1C and 3, client 102 responds to query 108 with response 108b, indicating, for example, in the example shown in FIGS. 1A-1E, that software and/or hardware required to display rich media file 105 prepared in formats 106-C and 106-E are available. In the preferred embodiment, this procedure is transparent to the user, such that the user is not required to take action to initiate this step, and the process is not noticeable to the user.

Determining the ability of client 102 to playback rich media file 105 may, in an alternative embodiment, be implicitly accomplished, by sending rich media file 105 via a particular computer network 101, or in a particular file format, or toward a particular device or electronic appliance, where the ability of client 102 to playback rich media file 105 could be assumed. For example, in one embodiment, information about the technical environment of client 102 may be known by virtue of the connection established between client 102 and server 103 over computer network 101 (e.g. it may be known that client 102 is connected to server 103 from a computer, using a browser, over the internet, or that client 102 is connected to server 103 from a handheld device, such as a Palm VII device, over a wireless network.) If such information about the technical environment of client 102 is sufficient to make a determination of the appropriate file format in which to send rich media file 105 to client 102, steps 302 and 303 may be skipped.

Figure 1D:
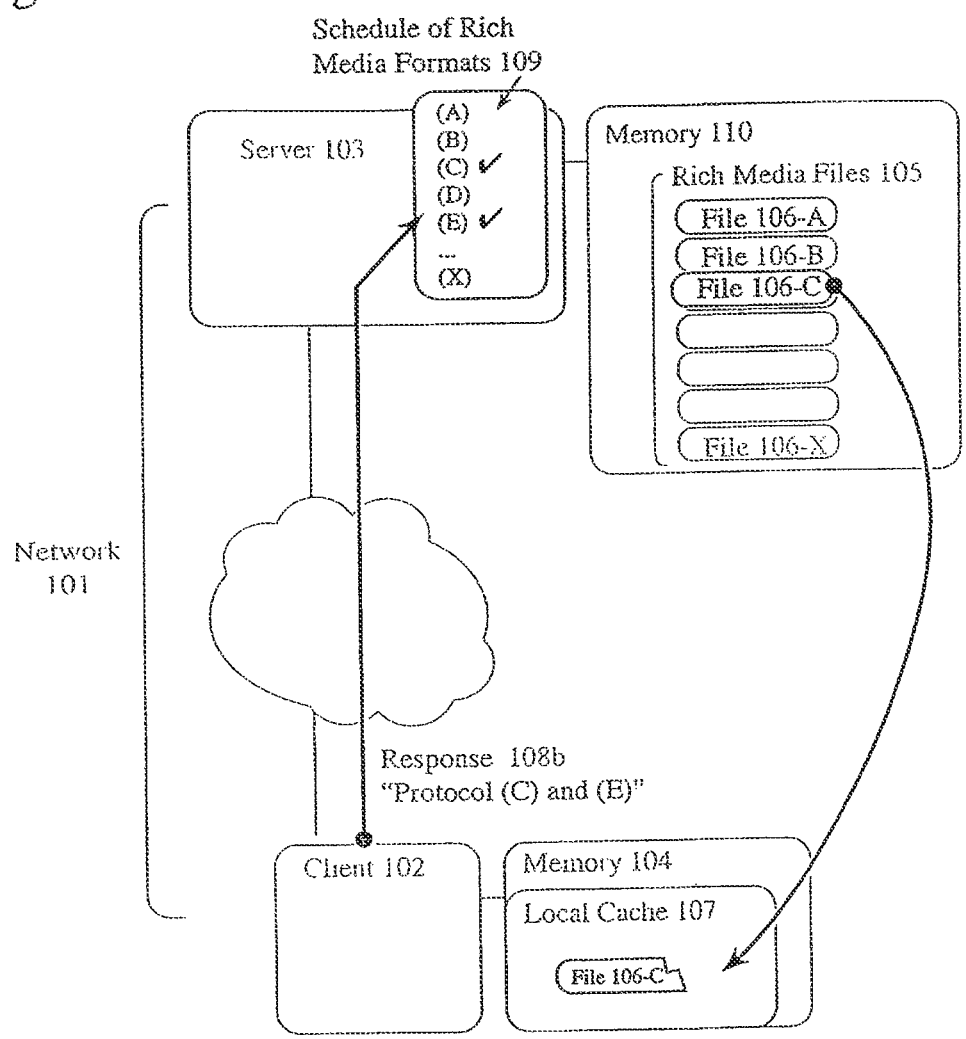

At a step 304, as shown in FIGS. 1D and 3, server 103 compares response 108b to a predefined schedule 109 of rich media file formats 106-A, 106-B . . . 106-X. Schedule 109 contains a predefined preference ranking of the various available rich media file formats 106-A, 106-B . . . 106-X. The reason a preference may exist for one file format over another is that one fife format may offer the client 102 higher video quality, audio quality, speed of download, or other features, than another format. In the preferred embodiment, this procedure is transparent to the user, such that the user is not required to take action to initiate this step, and the process is not noticeable to the user. As an alternative to step 304, an appropriate format of rich media file 105 can be created "on-the-fly" by generating a script for rich media content 105 compatible with the local playback capabilities of client 102.

Based on the comparison at step 304, rich media file 105 is sent to client 102 in the preferred file format at a step 305. As shown in FIG. 1D, for example, rich media file 105 in file format 106-C is downloaded from server 103 to client 102. In the example shown in FIGS. 1A-1E, while both file format 106-C and file format 106-E were determined to be suitable for playback on client 102, because file format 106-C is ranked higher than file format 106-E in schedule 109, server 103 transfers rich media 105 in file format 106-C from memory 110 of server 103 to memory 104 of client 102. In the preferred embodiment, this procedure is transparent to the user, such that the user is not required to take action to initiate this step, and the process is not noticeable to the user.

In the preferred embodiment, in the event that response 108B from client 102 did not match any of the file formats 106-A, 106-B . . . 106-X available in schedule 109, or if response 108B from client 102 did not match any of the file formats 106-A, 106-B . . . 106-X ranked above a certain preference level, server 103 will not send rich media file 105 to client 102, as shown at a step 305a. Since the process according to the present invention, in the preferred embodiment, is transparent to the user, the user would not be aware that the transfer of rich media file 105 was unsuccessful.

Figure 1E:
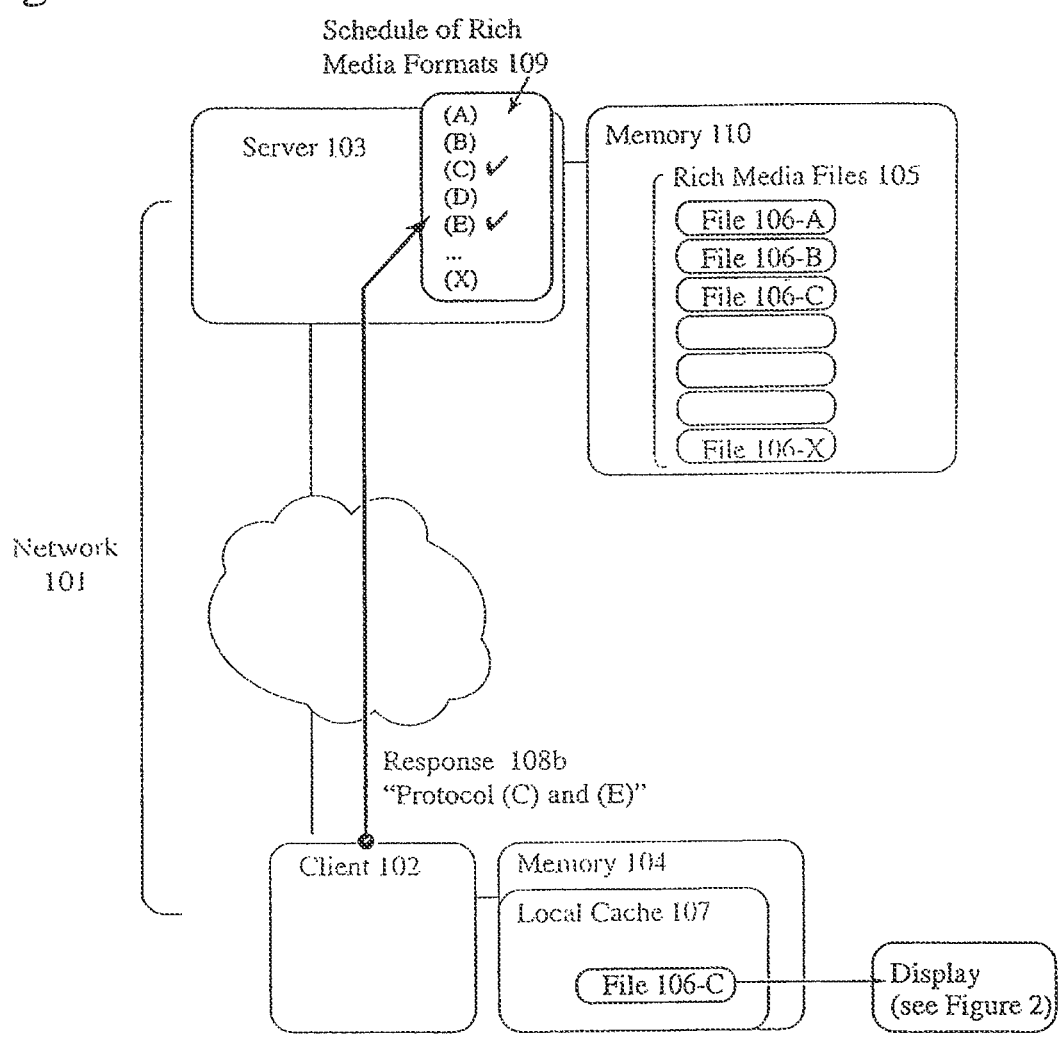

At a step 307, as shown in FIGS. 1E and 3, after the entirety of rich media file 105, in preferred file format 106-C, has been completely loaded into local cache 107 of client 102, as shown in a step 306, rich media file 105 may be displayed. For example, as shown in FIGS. 2A.-2C, rich media file 105 may be displayed in a designated display area 202 of a physical display area 200 of client 102.

Designated display area 202 is defined as a region, screen, or application window that is used for displaying rich media content 105, and is distinct from content display area 201, previously being viewed by a user in physical display area 200. Physical display area 200 is the total area of an electronic device which is dedicated to and available for displaying information, such as a computer's monitor or a cellular phone's LCD display screen, whereas content display area 201 is defined as the part of physical display area 200 actually being used to display content at a given moment. In the case of a small handheld device, display areas 201 and 202 may occupy the same physical space (e.g. the entirety of physical display area 200) as shown in FIG. 2A, or all or part of a "layer" of visual content within physical display area 200, as shown in FIGS. 2B and 2C, superimposed over a portion of a preexisting content display area 201 (e.g. a main browser window) of client 102.

Regardless of the physical space occupied by rich media content 105, the designated display area 202 is separate in the sense that it can be manipulated (replayed, dismissed, forwarded to another user, etc.), as described below, without affecting the remainder of the content being viewed by the user. As shown in FIGS. 2A-2C, controls 203 may be provided for manipulating rich media content 105 at a step 308. Controls 203 may be implemented in a variety of manners, including but not limited to, mechanical buttons, onscreen representations of buttons, onscreen menus, keystrokes, pen-based input methods, voice commands, ocular movements, a menu bar, navigation bar, or toolbar. Types of manipulation that might be performed may include the ability to replay; to turn any associated sound on or off; to turn any associated video on or off; to close or dismiss rich media content 105; to respond to rich media content 105 by redirecting the software, hardware, or electronic appliance to another source for electronic information on computer network 101; to respond to rich media content 105 by acknowledging receipt; to respond to rich media content 105 by answering a question; and/or to store rich media content 105 or a reference to rich media content 105 for future viewing by user. Additionally, rich media content 105 or a reference to rich media content 105 may be forwarded to another user by entering the email address, location, address, or other contact information for such other user, either manually or through referencing a list of predetermined recipients. Forwarding may mean simply including the sending of a reference to rich media content 105 (such as a URL, an alias, a pointer, or other means of locating files on a computer network), or the actual transfer of rich media file 105 to the other user. In the context of online advertising, forwarding to additional users increases the overall exposure to the advertisement's message. Therefore, a user may be encouraged to forward rich media content 105, for example, by the amusing or entertaining nature of rich media content 105, or through incentives, premiums or discounts offered for forwarding. Additionally, the address or coordinates of recipients of rich media 105 may be stored on computer network 101 (e.g. in a database on server 103), for future use by advertisers to target specific groups of individuals.

Figure 4:
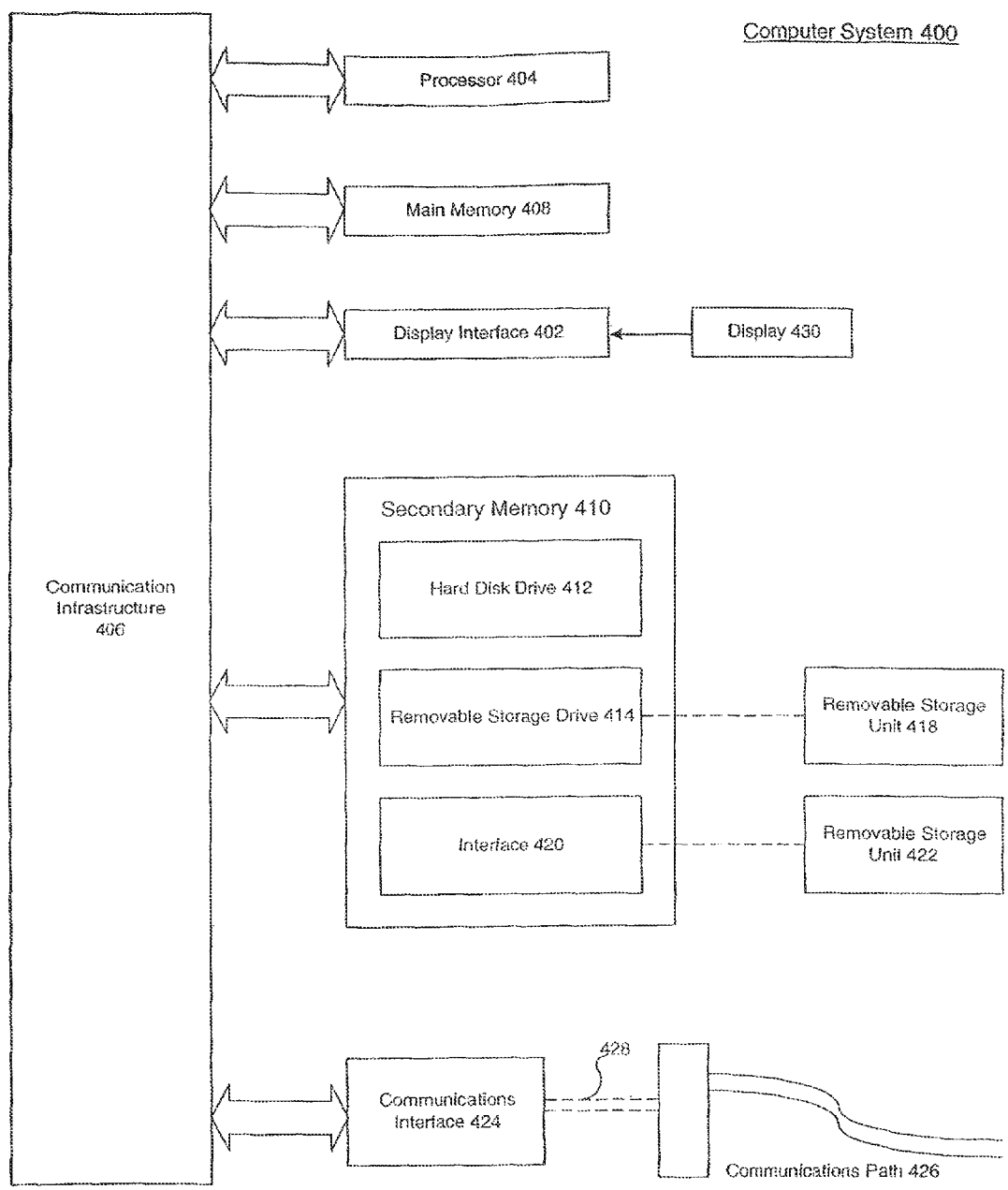
FIG. 4 is a block diagram of an example computer system useful for implementing the present invention.

The present invention may be implemented using hardware, software or a combination thereof and may be implemented in one or more computer systems or other processing systems. An example computer system 400 useful in implementing the present invention is shown in FIG. 4. The computer system 400 includes one or more processors 404. Processor 404 is connected to a communication infrastructure 406 (e.g., a communications bus, cross-over bar, or network). Various software embodiments are described in terms of this exemplary computer system. After reading this description, it will become apparent to a person skilled in the relevant art how to implement the invention using other computer systems and/or computer architectures.

Computer system 400 may include a display interface 402 that forwards graphics, text, and other data from the communication infrastructure 406 for from a frame buff not shown) for display on a display unit 430.

Computer system 400 also includes a main memory 408, preferably random access memory (RAM), and may also include a secondary memory 410. The secondary memory 410 may include, for example, a hard disk drive 412 and/or a removable storage drive 414, representing, for example, a floppy disk drive, a magnetic tape drive, or an optical disk drive. Removable storage drive 414 reads from and/or writes to a removable storage unit 418 in a well-known manner. Removable storage unit 418, for example a floppy disk, magnetic tape, or optical disk, is read by and written to by removable storage drive 414. As will be appreciated, removable storage unit 418 includes a computer usable storage medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, and a PCMCIA slot and card. Software and data transferred via communications interface 424 are in the form of signals 428 which may be electronic, electromagnetic, optical or other signals capable of being received by communications interface 424. These signals 428 are provided to communications interface 424 via a communications path (i.e., channel) 426. This channel 426 carries signals 428 and may be implemented using wire or cable, fiber optics, a phone line, a cellular phone link, an RF link and other communications channels.

In this document, the terms "computer program medium" and "computer usable medium" are used to generally refer to media such as removable storage drive 414, a hard disk installed in hard disk drive 412, and signals 428. These computer program products are means for providing software to computer system 400. The invention is directed to such computer program products.

Computer programs (also called computer control logic) are stored in main memory 408 and/or secondary memory 410. Computer programs may also be received via communications interface 424. Such computer programs, when executed, enable the computer system 400 to perform the features of the present invention as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein wilt be apparent to persons skilled in the relevant art.

In yet another embodiment, the invention is implemented using a combination of both hardware and software.

The method according to the present invention allows for a highly entirely transparent process for displaying high-quality online advertising imagery. While a number of embodiments of the present invention have been described above, it should be understood that they have been presented by way of example, and not limitation. It will be apparent to persons skilled in the relevant art that various changes in form and detail can be made therein without departing from the spirit and scope of the invention. For example, while the above embodiments have focused on the application of the method according to the present invention to the display of online advertisements, the method according to the present invention also can be used to provide other forms of rich media content to a user over a computer network, as would be apparent to those of skill in the relevant art. Thus the present invention should not be limited by any of the above-described exemplary embodiments, but should be defined only in accordance with the following claims and their equivalents.

What is claimed is:
1. A method for selecting media content, the method comprising:
  receiving a request at a server from a client, the request is to establish a connection over a particular network between the client and the server;
  establishing the connection over the particular network between the client and the server based on the request;

identifying, at the server, a first network type from a plurality of network types based on the particular network utilized to establish the connection;

identifying, at the server, technical environment information at the client based on the first network type;

identifying an ability of the client to playback media content locally based on the technical environment information at the client as identified by the server based on the first network type; and selecting, at the server, a version of media content appropriate for playback at the client locally based on the ability of the client that is identified based on the technical environment information at the client that is identified by the server based on the first network type that is identified at the server based on the particular network that is utilized to connect the client to the server.

2. The method of claim 1, wherein the first network type includes a physical network and wherein the physical network includes the Internet, and wherein the client includes a browser, and wherein the connection is over the Internet to the browser, the method including sending the version of the media content appropriate for playback at the browser locally over the Internet to the browser.

3. The method of claim 1, wherein the first network type includes a wireless network, and wherein the client includes a first wireless device, and wherein the connection is over the wireless network to the first wireless device, the method including sending the version of the media content appropriate for playback at the first wireless device over the wireless network to the first wireless device.

4. The method of claim 3, further including forwarding the version of the media content appropriate for playback at the first wireless device from the first wireless device to a second wireless device.

5. The method of claim 1, wherein the version of the media content comprises a media file with a media file format that is selected from a plurality of media file formats available for the media content.

6. The method of claim 5, wherein the media file format is at least one of a video quality media file format, an audio quality media file format, a speed of download media file format, a RealAudio file format, an audio interchange file format, a handheld device markup language format, a wireless markup language format, an image file format or a format associated with the Wireless Communications Association.

7. The method of claim 1, wherein the client is at least one of a software client, a hardware client, or a network appliance client.

8. The method of claim 1, wherein the version of the media content comprises rich media content and wherein the version rich media content comprises a video clip.

9. The method of claim 1, wherein the version of the media content comprises rich media content and wherein the rich media content comprises an advertisement.

10. The method of claim 1, further including comparing, at the server, the ability of the client to playback the media content locally against a predefined schedule including a plurality of media file formats available for the media content, and wherein the predefined schedule comprises a preference ranking of the plurality of media file formats available for the media content.

11. A system to select media content, the system comprising:

a server comprising:

a processor; and control logic in communications with the processor, the control logic to receive a request at the server from a client, the request is to establish a connection over a particular network between the client and the server, the control logic to establish the connection over the particular network between the control logic and the client based on the request, the control logic to identify, at the server, a first network type from a plurality of network types based on the particular network utilized to establish the connection, the control logic to identify, at the server, technical environment information at the client based on the first network type, the control logic to identify an ability of the client to playback media content locally based on the technical environment information at the client as identified by the server based on the first network type, and the control logic to select a version of media content appropriate for playback at the client locally based on the ability of the client that is identified based on the technical environment information at the client that is identified by the server based on the first network type that is identified at the server based on the particular network that is utilized to connect the client to the server.

12. The system of claim 11, wherein the first network type includes a physical network and wherein the physical network includes the Internet, and wherein the client includes a browser, wherein the connection is over the Internet to the browser and wherein the control logic is to send the version of the media content appropriate for playback at the browser locally over the Internet to the browser.

13. The system of claim 11, wherein the first network type includes a wireless network, and wherein the client includes a first wireless device, wherein the connection is over the wireless network to the first wireless device and wherein the control logic is to send the version of the media content appropriate for playback at the first wireless device locally over the wireless network to the first wireless device.

14. The system of claim 13, wherein the control logic forwards the version of the media content appropriate for playback at the first wireless device from the first wireless device to a second wireless device.

15. The system of claim 11, wherein the client is at least one of a software client, a hardware client, or a network appliance client.

16. The system of claim 11, wherein the first network type includes a physical network that includes the Internet.

17. The system of claim 11, wherein the first network type includes a wireless network.

18. A computer program product, embodied in a non-transitory computer useable medium storing control logic that, when executed by a first computer system, causes the first computer system to perform operations comprising:

receiving a request from a second computer system, the request is to establish a connection over a particular network between the first computer system and the second computer system;

establishing the connection over the particular network between the first computer system and the second computer system;

identifying, at the first computer system, a first network type from a plurality of network types based on the particular network utilized to establish the connection;

identifying technical environment information at the second computer system based on the first network type;

identifying an ability of the second computer system to playback media content locally based on the technical environment information at the second computer system; and selecting, at the first computer system, a version of media content appropriate for playback at the second computer system locally based on the ability of the second computer system that is identified based on the technical environment information at the second computer system that is identified based on the first network type that is identified at the first computer system based on the particular network that is utilized to connect the second computer system to the first computer system.

19. A system for selecting media content, the system comprising:
- a server comprising:
- a processor; and
- control logic in communications with the processor, a means for receiving a request at the server from a client, the request is to establish a connection over a particular network between the client and the server, the control logic to establish the connection over the particular network between the control logic and the client based on the request, the control logic to identify, at the server, a first network type from a plurality of network types based on the particular network utilized to establish the connection, the control logic to identify the technical environment information at the client based on the first network type, the control logic to identify an ability of the client to playback media content locally based on the technical environment information at the client as identified by the server based on the first network type, the control logic to select a version of media content appropriate for playback at the client locally based on the ability of the client that is identified based on the technical environment information at the client that is identified by the server based on the first network type that is identified at the server based on the particular network that is utilized to connect the client to the server.

* * * * *